United States Patent [19]

McVay et al.

[11] Patent Number: 4,977,231

[45] Date of Patent: Dec. 11, 1990

[54] PHENOLIC RESIN CONTAINING A LATENT HARDENING AGENT COMPRISING THE CARBAMATE REACTION PRODUCT OF A CYCLIC

[75] Inventors: Ted M. McVay; Gene F. Baxter, both of Lithonia, Ga.

[73] Assignee: Georgia-Pacific Corporation, Atlanta, Ga.

[21] Appl. No.: 337,483

[22] Filed: Apr. 13, 1989

[51] Int. Cl.$^5$ .................... C08G 8/10; C08G 8/28; C08G 14/067

[52] U.S. Cl. ................... 528/142; 528/146; 528/162; 528/140; 525/504; 156/335

[58] Field of Search ................... 528/142, 162

[56] References Cited

U.S. PATENT DOCUMENTS

| | | | |
|---|---|---|---|
| 1,523,459 | 1/1925 | Sutherland | 528/129 |
| 2,339,769 | 8/1941 | D'Alelio | 528/162 |
| 2,339,770 | 1/1944 | D'Alelio | 528/162 |
| 2,340,045 | 1/1944 | D'Alelio | 528/162 |
| 2,340,046 | 1/1944 | D'Alelio | 528/162 |
| 2,627,524 | 2/1953 | Malkemus | 560/166 |
| 3,342,776 | 9/1967 | Lambuth | 528/147 |
| 4,352,913 | 10/1982 | Zondler et al. | 525/504 |
| 4,520,167 | 5/1985 | Blank et al. | 524/440 |
| 4,558,783 | 5/1986 | Chang | 206/472 |
| 4,731,430 | 3/1988 | Kempter et al. | 528/162 |
| 4,758,478 | 7/1988 | Daisy et al. | 528/147 |

FOREIGN PATENT DOCUMENTS 1065605 10/1957 Fed. Rep. of Germany .
1469823 10/1959 Fed. Rep. of Germany .
1550847 1/1967 France .

*Primary Examiner*—John Kight, III
*Assistant Examiner*—Frederick Krass
*Attorney, Agent, or Firm*—Banner, Birch, McKie & Beckett

[57] ABSTRACT

Carbamate curing agents for phenol-aldehyde resins provide a delayed curing period for product assembly. Thereafter, the resin cures quickly even at low temperatures.

27 Claims, No Drawings

PHENOLIC RESIN CONTAINING A LATENT HARDENING AGENT COMPRISING THE CARBAMATE REACTION PRODUCT OF A CYCLIC

FIELD OF THE INVENTION

The invention relates to phenol-formaldehyde curing agents, wood products using them, and curing methods.

BACKGROUND OF THE INVENTION

Phenol-aldehyde resins are good adhesives for wood products. Exemplary wood products include plywood, particle board, veneers, oriented strandboard, hard board, and waferboard type wood products. These resins exhibit high strength and good chemical resistance making them desirable for wood products facing harsh environmental conditions. Unfortunately, resins do not become activated until 55° C. and require relatively long periods to set at room temperature as well as temperatures over 200° F. as are routinely used for making wood products.

An ideal resin adhesive would have a low viscosity and allow sufficient time for manipulation of the coated product. The time for manipulation is generally referred to as the "assembly time" or the "pot life." The time needed for applying the resin adhesive and manipulating the wood product will depend on the particular wood product.

Thereafter, the adhesive viscosity should increase quickly, become set, and cure in a minimum amount of time. Cure accelerating agents (also known as "hardening agents") are typically added to the resin at some stage in the process to adjust the hardening rate.

Isocyanate and alkylene carbonate curing agents are recognized as effective hardening agents but each has certain drawbacks. Isocyanate poses safety and environmental problems. Alkylene carbonates are too fast. They induce substantially instantaneous crosslinking and have a negligible pot life. Propylene carbonate gels instantaneously at room temperature and in about 30 seconds at 0° F. This pot life is far too short for wood product manipulation particularly at the far higher temperatures normally encountered in commercial process. Most continuous plants require 20-45 minutes for assembly.

It would be desirable to have a curing agent that could be premixed with the resin and retain a low viscosity for assembly of the wood but which would set and cure quickly at economically low temperatures.

SUMMARY OF THE INVENTION

It is an object of the invention to provide curing agents for phenol-aldehyde resins that provide an economic assembly time with good curing rates at low temperatures.

Further objects of the invention are to provide a curing method, a wood product, and an adhesive composition using such curing agents in phenol-aldehyde resins. Other objects will become apparent from the description below.

In accordance with the above objects, the invention relates to an adhesive composition having a phenol-aldehyde resin and a carbamate reaction product of: (a) a carbonate selected from the group consisting of alkylene, glycidol, and epoxy resin carbonates; and (b) ammonia.

The curing method of the invention comprises:
mixing a phenol-aldehyde resin having an aldehyde:phenol molar ratio of at least 1.05 with an amount of a curing agent effective to cure said resin, said curing agent comprising a carbamate reaction product of: (a) a carbonate selected from the group consisting of alkylene, glycidol, and epoxy resin carbonates; and (b) ammonia; and
curing said resin.

Employing the carbamates of this invention, the adhesive exhibits a low initial viscosity over a controllable assembly period with a rapid set and sure at economically low temperatures. Higher temperatures will, of course, shorten the time for set and cure. These properties can be used to increase the wood moisture level out of the press and increase the mill productivity without substantial modification to existing systems.

DETAILED DESCRIPTION

Phenol-aldehyde resins are made by condensation in an alkaline medium. As used herein, "alkaline" refers to alkali or alkaline earth metal hydroxides in solution. Preferably the metal is sodium, potassium, lithium, calcium, or barium. Most preferably, the alkaline metal is sodium. Resins cured in such an alkaline medium are generally known as "resole" resins. These resins should have a molecular weight of greater than about 1200 for use as adhesives.

The resins of the invention are phenol-aldehyde resins having an aldehyde:phenol molar ratio of at least about 1.05. Preferably this molar ratio is greater than about 1.05 to less than about 5; most preferably, this ratio is from about 1.1 to about 3. The aldehydes useful for the resin are aliphatic aldehydes having one to four carbon atoms. Preferably these aldehydes include formaldehyde and acetaldehyde. Most preferably the aldehyde is formaldehyde. The resin should have a free aldehyde concentration of less than about 0.5 wt. percent, most preferably less than about 0.2 wt. percent.

The latent hardening agent according to the invention includes a reaction product having, at least in part, an hydroxyalkyl carbamate. The hardening agent can be added to or mixed with the resin in an amount of less than about 20 wt. percent. Preferably, the hardening agent is present at about 2 to about 10 wt. percent of said resin.

The hydroxyalkyl carbamate hardening agent is the reaction product of: (a) a carbonate selected from the group consisting of alkylene, glycidol, and epoxy resin carbonates; and (b) ammonia. Preferably, the carbonate is an alkylene carbonate having less than about thirty carbon atoms; most preferably, the carbonate is an ethylene or propylene carbonate. The most preferred carbamate hardening agent is the reaction product of propylene carbonate and ammonia.

One suitable method for forming hydroxyalkyl carbamates according to the invention is set forth in U.S. Pat. No. 2,627,524 which is herein incorporated by reference. Briefly stated, alkyl carbonates are reacted with ammonia to produce the corresponding carbamate. Excess ammonia at temperatures of no greater than 50° C. is generally desired.

Hydroxyalkyl carbamate hardening agents for the invention provide a controllable, delayed curing. The delay appears to occur because carbamates exist in an equilibrium within the phenolaldehyde resins with their parent carbonate and ammonia. Methylol groups from the resin seem to start reacting with residual ammonia and thereby shift the carbonate/ammonia equilibrium toward the formation of carbonate. The carbamate then breaks down by what is believed to be some form of hydrolysis mechanism to produce an increasing amount of the carbonate. The carbonate starts to catalyze the crosslinking action as soon as it is formed and increases that effect rapidly as the concentration builds. The crosslinking rate is not linear. (See, FIG. 1). This hydrolysis period is believed to account for the delayed curing and provides a latent period for assembly of about a few minutes to about 3 hours.

As a comparison, resin without hardening agents will set up at 375° F. in about 7 minutes, resin with carbamate agents according to the invention will set up in 2½ minutes at 212° F., and resin having a propylene carbonate sets up in a few seconds at room temperature. Since every 7° F. decrease translates into a reaction rate drop of 50%, the significant commercial importance of the instant agents becomes clear.

The duration of the latency period can be shortened or extended by controlling the initial carbamate concentration and the residual nitrogen concentration in the resin. High carbamate concentrations will increase the crosslinking rate and shorten the pot life. Excess nitrogen compounds slow the carbamate hydrolysis and thereby increase the assembly time. The final bond strength is unaffected in either case.

In accordance with the invention, the curing agent/resin adhesive mixture can be used directly and without further modification or additives in dry process hardboard, particle board, oriented strandboard, and waferboard. In these products, the resin and hardening agent may be added up to about 6 wt. percent of the total furnish/adhesive composition. Preferably, the resin and hardening agent constitute about 2 to about 5 wt. percent of the total adhesive composition. For other products, conventional additives, such as urea, may be used if desired.

The adhesive according to the invention may be applied by conventional methods such as spraying, brushing, roller coating, and curtain coating. The hardening agent may be incorporated into the adhesive by premixing it with the resin, spraying resin and agent in separate streams, or by any other method.

Examples have been included herein to illustrate the invention but are not intended to limit the scope of the appended claims. All viscosities discussed in the examples are centistokes measured at 25° C.

EXAMPLE 1

The following were mixed in a stirring vessel and heated to 80° C. within 30 minutes:
990 g (10.56 mols) phenol
579 g (9.65 mols) of 50% formaldehyde solution
848 g water
222 g (2.78 mols) of 50% sodium hydroxide These components were maintained at a temperature within 80° to 82° C. Thereafter, 1342 g (22.37 mols) of 50% formaldehyde was added over 45 minutes. The mixture was allowed to react at 81° to 83° C. until reaching a viscosity of 165 centistokes. At that time, 371 g (4.64 mols) of sodium hydroxide and 267 g (2.84 mols) of phenol were added. The mixture was cooled to 71° C. and maintained at that temperature to a viscosity of 1070 centistokes. Then, 578 g (9.63 mols) of urea was added and the mixture was cooled to 25° C.

The resin had a formaldehyde to phenol ratio of 2.4. The resulting resin also had a sodium hydroxide to phenol molar ratio of 0.55.

EXAMPLE 2

One hundred fifty-four grams of particle board furnish with a moisture content of 4.0 wt. percent was added to 23.5 g of the phenolic resin of Example I. A hardening agent of 2.5 g (9.6 wt. percent) hydroxypropyl carbamate solution was then added. Materials were mixed for 2 minutes and poured into a box of 5.5"×5.5". Material was pressed at 300° F. and 700 psi.

At 10 minutes after the carbamate had been added, the resin was in an uncured state and contained about 4.9% propylene carbonate.

The sample was pressed for either 2.5 or 3 minutes and post cured in an autoclave heated at a temperature within 237° to 247° F. for 16 hours. Bond strengths of the samples are show in Table 1.

TABLE 1

| Press Time (min) | 2.5 | | 3.0 | |
|---|---|---|---|---|
| Cure Time (hrs) | 16 | 16 | 16 | 16 |
| Post Cure | No | Yes | No | Yes |
| Internal Bond Strength (psi) | 33.5 | 39.1 | 70.3 | 84.0 |

EXAMPLE 3

The following components were mixed: 1323 grams of phenol, 583 grams of water, 307 of 50% sodium hydroxide solution. To this mixture was added 754 grams of 50% formaldehyde over 13 minutes. The temperature was allowed to rise to 85° C. Thereafter 1122 grams of 50.1% formaldehyde was added over 20 minutes at a temperature of less than 90° C. The mixture was held at 90° C. until the viscosity was 125 centistokes. The mixture was then cooled to 85° C. and held at that temperature until a viscosity of 470 centistokes. Thereafter, 308 grams of 50% sodium hydroxide was added and maintained at a temperature within 82° to 85° C. until a viscosity of 1125 centistokes. Sodium hydroxide at 475 grams was then added, and the mixture was held at 87° C. until reaching a viscosity of 2015 centistokes. Then, 929 grams of water was added. The mixture was held at a temperature within 86° to 89° C. to a viscosity of 616 centistokes. The resin was cooled to room temperature and appear as a red liquid with 43% solids.

The resin had a formaldehyde:phenol molar ratio of 2.2 and a sodium hydrodide:phenol molar ration of 0.43.

EXAMPLE 4

This example shows the bonding strengths of the resin made in Example 3. The following were added: 54 grams of particle board furnish having a moisture of 4.0 wt. percent was mixed with 21.9 grams of the resin from Example 3 and 5.45 grams of hydroxypropyl carbamate(19.9 wt. percent solution). This material was mixed for 10 minutes and poured into a 5½"×5½" box. The sample was pressed at 300° F. and 700psi.

At 15 minutes after addition of the carbamate, the resin was in an uncured state and contained 9.3 wt. percent propylene carbonate. Bonding strengths are listed in Table 2.

TABLE 2

| Press Time (min) | 2.5 | | 3.0 | |
|---|---|---|---|---|
| Cure Time (hrs) | 16 | 16 | 16 | 16 |

TABLE 2-continued

| Press Time (min) | 2.5 | | 3.0 | |
| --- | --- | --- | --- | --- |
| Press Temp (F.) | 200 | 250 | 200 | 250 |
| Internal Bond Strength (psi) | 24.4 | 71.1 | 32.5 | 89.1 |

EXAMPLE 6

Catalyzed and uncatalyzed resins were prepared as shown in Table 3. Each resin was tested for strength by the conventional American Plywood Association Vacuum-Pressure Soak Test. The results are shown in Table 4. The wood is a 3-ply, ⅛inch southern pine plywood having panels made with a veneer of a 6.4% moisture content. The hot press temperature was 280° F. with a 10 to 15 minute period between mixture and pressing. The panels were prepressed at a 150 psi for 4 minutes and hot pressed at 200 psi with a precure time of 1 minute. The total assembly time was 30 to 35 minutes. The post cure period was 16 hours.

As one can see from Table 4, the catalyzed mix according to the invention resulted in good bonding strengths at shorter press times.

TABLE 3

| | Mixing Time (min.) | Uncatalyzed Mix (wt. %) | Catalyzed Mix (wt. %) |
| --- | --- | --- | --- |
| Water | | 1.81 | 1.81 |
| Resin | 1 | 26.28 | 26.28 |
| Phenofil | 2 | 7.62 | 7.62 |
| Resin | 2 | 7.47 | 7.47 |
| Plybond wheat flour | 2 | 4.61 | 4.61 |
| 50% NaOH | 20 | 3.41 | 3.41 |
| Resin | 5 | 38.77 | 38.77 |
| water | 1 | 10.03 | — |
| Curing agent (53% solids hydroxypropyl carbamate solution) | 1 | — | 10.03 |
| | | 100.00 | 100.00 |

TABLE 4

| % Wood Failure by V-P Test | Uncatalyzed Mix | Catalyzed Mix |
| --- | --- | --- |
| 2.25 minute press time | — | 45.0 |
| 2.50 minute press time | — | 62.5 |
| 2.75 minute press time | — | 74.5 |
| 3.00 minute press time | — | 82.0 |
| 3.25 minute press time | 30.0 | 88.0 |
| 3.50 minute press time | 56.0 | 93.0 |
| 3.75 minute press time | 74.0 | 96.0 |
| 4.00 minute press time | 88.0 | 95.0 |
| 4.25 minute press time | 94.0 | 95.5 |
| 4.50 minute press time | 91.0 | — |
| 4.75 minute press time | 96.0 | — |

It will be understood that the examples set forth above are intended as illustrations rather than as limitations to the appended claims.

We claim:

1. A method for curing a phenol-aldehyde resin comprising:
    mixing a phenol-aldehyde resin having an aldehyde:phenol molar ratio of at least 1.05 with an effective amount of a curing agent comprising a carbamate reaction product of: (a) a carbonate from the group consisting of alkylene, glycidol, and epoxy resin carbonates; and (b) ammonia;and
    curing said resin.

2. The method according to claim 1 wherein said carbamate reaction product comprises a reaction product of an alkyl carbonate having two to six carbon atoms and ammonia.

3. The method according to claim 2 wherein said carbamate reaction product comprises hydroxpropyl carbamate.

4. The method according to claim 2 wherein the carbamate reaction product comprises hydroxyethyl carbamate.

5. The method according to claim 1 wherein said effective amount of reaction product is about 1 to about 20 wt. percent.

6. The method according to claim 1 wherein said aldehyde is formaldehyde.

7. The method according to claim 1 wherein said resin further comprises an alkaline metal medium.

8. The method according to claim 7 wherein said alkaline medium is an alkali metal.

9. The method according to claim 8 wherein the alkali metal is sodium.

10. The method according to claim 1 further comprising: controlling the amount of curing agent added to said resin in order to control said curing rate.

11. The method according to claim 1 wherein said resin contains an alkaline metal hydroxide at a content of about 0.05 to about 1.0 mols of alkaline metal hydroxide per mole of phenol.

12. An adhesive composition exhibiting delayed curing, said composition comprising:
    a phenol-aldehyde having an aldehyde:phenol molar ratio of at least 1.05; and
    a curing agent comprising about 1 to about 20 wt% of a carbamate reaction product of: (a) a carbonate from the group consisting of alkylene, glycidol, and epoxy resin carbonates; and (b) ammonia.

13. The composition of claim 12 wherein said curing agent comprises hydroxypropyl carbamate.

14. The composition according to claim 12 wherein said curing agent comprises hydroxyethyl carbamate.

15. The composition of claim 12 wherein the curing agent comprises a reaction product of an alkyl carbonate having two to six carbon atoms and ammonia.

16. The composition according to claim 12 wherein said aldehyde is formaldehyde.

17. The composition according to claim 12 wherein said resin contains an alkaline metal hydroxide at a content of about 0.05 to about 1.0 mols of alkaline metal hydroxide per mole of phenol.

18. The composition according to claim 17 wherein said alkaline hydroxide is sodium hydroxide.

19. A method for bonding a wood product, said process comprising:
    contacting a wood product with an adhesive comprising a phenol-aldehyde resin having an aldehyde:phenol molar ration of at least 1.05 and a curing agent comprising a carbamate reaction product of: (a) a carbonate from the group consisting of alkylene, glycidol, and epoxy resin carbonates; and (b) ammonia; and
    curing said resin to bond said wood product.

20. The method according to claim 19 wherein said curing agent comprising hydroxypropyl carbamate.

21. The method according to claim 19 wherein said curing agent comprising hydroxyethyl carbamate.

22. The method according to claim 19 wherein said curing agent is present in an amount in said resin of about 1 to about 20 wt. percent.

23. The method according to claim 19 wherein said aldehyde is formaldehyde.

24. The method according to claim 19 wherein said resin further comprises an alkaline metal hydroxide.

25. The method according to claim 24 wherein said alkaline metal hydroxide is selected from the group consisting of hydroxides of sodium, lithium, potassium, calcium, or barium.

26. The method according to claim 25 wherein said alkaline metal hydroxide is sodium hydroxide.

27. The method according to claim 25 further comprising:
controlling the rate of forming said carbonate from said carbamate in order to control the curing rate.

* * * * *

UNITED STATES PATENT AND TRADEMARK OFFICE
CERTIFICATE OF CORRECTION

PATENT NO. : 4,977,231
DATED : December 11, 1990
INVENTOR(S) : Ted M. McVay et al.

It is certified that error appears in the above-identified patent and that said Letters Patent is hereby corrected as shown below:

Title Page: Column 1, [73], "Georgia-Pacific Corporation" should be --Georgia-Pacific, Resins, Inc.--.

Signed and Sealed this

Fifteenth Day of September, 1992

Attest:

DOUGLAS B. COMER

Attesting Officer     Acting Commissioner of Patents and Trademarks

UNITED STATES PATENT AND TRADEMARK OFFICE
CERTIFICATE OF CORRECTION

PATENT NO.   :   4,977,231
DATED        :   December 11, 1990
INVENTOR(S)  :   Ted M. McVay et al.

It is certified that error appears in the above-identified patent and that said Letters Patent is hereby corrected as shown below:

Title Page:   Item: [73], "Georgia-Pacific, Resins, Inc."
should be --Georgia-Pacific Resins, Inc.--.

Signed and Sealed this

Second Day of November, 1993

Attest:

BRUCE LEHMAN

*Attesting Officer*    *Commissioner of Patents and Trademarks*